United States Patent [19]

Miller

[11] Patent Number: 4,460,941
[45] Date of Patent: Jul. 17, 1984

[54] FISHING LURE LIGHT

[75] Inventor: David A. Miller, Omaha, Nebr.

[73] Assignee: LeBron, Inc., Omaha, Nebr.

[21] Appl. No.: 423,208

[22] Filed: Sep. 24, 1982

[51] Int. Cl.³ .............................................. F21L 7/00
[52] U.S. Cl. .................... 362/158; 362/186; 362/196; 362/200; 362/205; 200/60
[58] Field of Search ............... 360/158; 362/186, 196, 362/200, 202, 205, 189, 101; 200/60

[56] References Cited

U.S. PATENT DOCUMENTS

| | | |
|---|---|---|
| 2,097,357 | 10/1937 | Watts . |
| 2,458,611 | 1/1949 | Long . |
| 2,500,442 | 3/1950 | Waite . |
| 2,536,408 | 1/1951 | Addicks . |
| 2,740,220 | 4/1956 | Caplan ............................ 362/158 |
| 2,908,101 | 10/1959 | Butler et al. ..................... 362/158 |
| 3,588,490 | 6/1971 | Nicholl ............................ 362/158 |
| 3,748,457 | 7/1973 | Balitzky .......................... 362/158 |
| 3,824,731 | 7/1974 | Sandschaper . |
| 4,109,405 | 8/1978 | Ito ................................... 362/158 |
| 4,234,913 | 11/1980 | Ramme ........................... 362/158 |
| 4,242,724 | 12/1980 | Stone .............................. 362/158 |
| 4,250,650 | 2/1981 | Fima . |
| 4,285,301 | 8/1981 | Reiss ............................... 362/183 |
| 4,336,574 | 6/1982 | Goodman ........................ 362/101 |

Primary Examiner—Stephen J. Lechert, Jr.
Assistant Examiner—Howard J. Locker
Attorney, Agent, or Firm—Glenn K. Robbins

[57] ABSTRACT

A fishing lure light for use with fishing lines and a separate lure or bait. The light is comprised of a housing adapted to be tied to a fish line next to a fish lure. The housing is constructed of plastic and is water tight. It houses a battery and light bulb which is switched on and off by pressing a plastic cover against the housing or pulling it away to make and break switch contacts.

4 Claims, 4 Drawing Figures

FISHING LURE LIGHT

BACKGROUND OF THE INVENTION

For night-time fishing there has long been a need for a simply operated light for illuminating a fishing lure. Such a light may serve as an attractant to lure fish to the vicinity of the lure which may not be visible until fish are attracted to the area.

While night-time fishing lights have been provided in the past they have generally been of somewhat complex structure and of substantial expense not lending themselves to wide spread usage.

SUMMARY OF THE INVENTION

By means of this invention there has been provided a simply operated inexpensive fishing lure light which may be simply fastened to a fishing line to attract fish to a lure or bait connected to the line.

The light may be operated by the fisherman by pressing a cover of a housing which contains a battery, the light to be energized and the connecting leads. The cover acts as a switch or energizing means to move contacts into or out of engagement with the battery by simply moving the cover toward or away from the housing.

The housing and cover are constructed of resilient and flexible plastic to provide tight water-tight seal while permitting the cover to be moved with respect to the housing.

The housing is of a shallow open cylindrical configuration and receives an inexpensive disc-shaped battery in a nested friction fit. Appropriate leads are connected to the battery contacts or terminals and to a light bulb. A spring-like lead is connected to one side of the light bulb and is moved into and out of contact with the battery by the fisherman who moves the cover by pressing it against the housing or pulling it away.

The housing is simply connected to the fishing line which is passed through a hole or eye in the housing.

The fishing lure light through the resilient plastic construction can be simply made with a water tight seal to contain the battery, light bulb and switching mechanism. It is rugged and inexpensive and may be effectively employed without the required of complex structure of rigging.

The above features are objects of this invention. Further objects will appear in the detailed description which follows and will be further apparent to those skilled in the art.

For the purpose of illustration of this invention preferred embodiments thereof are shown in the accompanying drawing. It is to be understood that the drawing is for purpose of description only and that the invention is not limited thereto.

IN THE DRAWING

DESCRIPTION OF THE INVENTION

Figure 1:
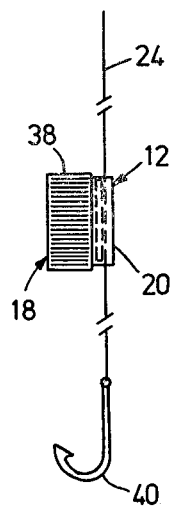
FIG. 1 is a pictorial view showing the fishing lure light attached to a fishing line.
Figure 2:
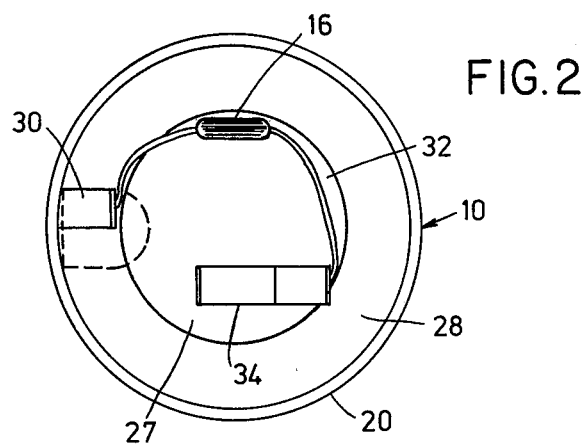
FIG. 2 is an enlarged top plan view of the light with the cover removed.

The fishing lure light of this invention is generally indicated by the reference numeral 10 in FIGS. 1 through 4. It is comprised of a housing 12, a battery 14, a light bulb 16 and a cover 18 which acts as a switch or actuator.

The housing 12 is constructed of plastic and has a flange 20 which may have one or more holes 22 which may be used for attachment to a fishing line 24 as shown in FIG. 1. The housing is circular and receives the circular disc-shaped battery 14 on a floor portion 25 in closely nested fashion by a friction fit within side wall 26.

The battery 14 is a conventional dry cell battery of disc-shaped configuration having a negative polarity top button contact 27 and a positive polarity bottom contact 28 of opposite polarity. A wire lead 30 in contact with the bottom contact 28 is connected to the light bulb 16. Lead 32 is connected to the opposite side of the light bulb and has a spring-like extension 34 which is adapted to be moved into and out of contact with the top button contact 27 of the battery by the operation of the cover switch 18 as will more fully appear hereinbelow.

Figure 3:
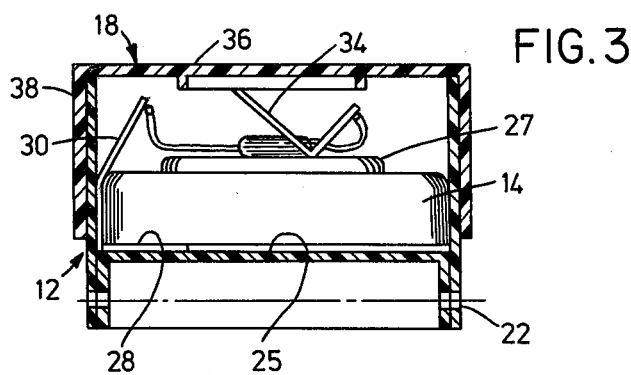
FIG. 3 is a view in section taken on line 3—3 of FIG. 2 with the cover added showing the light in the energized position.
Figure 4:
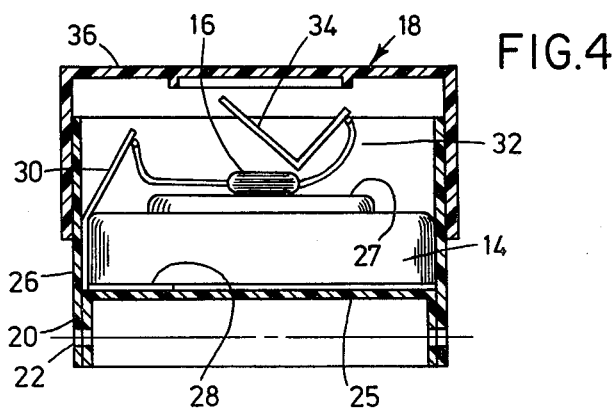
FIG. 4 is a view similar to FIG. 3 showing the light deenergized.

The cover 18 as best shown in FIGS. 3 and 4 is circular and has a top portion 36 and a downwardly depending skirt-like flange 38 which closely fits over the side wall 26 of the housing. The top cover is movable from a switch closing light energizing position as shown in FIG. 3 to a switch open position as shown in FIG. 4. In the switch closed position the top of the side wall 26 of the housing bears against the underside of the top 36 of the cover to serve as a stop limit. The switch opening and closing action is accomplished by the spring action of the spring-like extension 34 and the lead 32 which is biased out of contact with the contact 27 of the battery in the switch open position and moved into contact with the battery in the switch closed position.

The cover 18 through the flexibility and resiliency of the plastic construction may be simply moved from the switch open position of FIG. 4 to the switch closed position of FIG. 3. The close fit further provides a water tight seal to protect against entry of water to the interior of the housing. Further, a close fit of the side wall 26 of the housing permits the insertion of the battery in a tight friction fit.

USE

The fishing lure light of this invention is very simply employed. When not in use as in storage or the like the user simply holds the housing in one hand and grasps the cover and pulls it upwardly to the position shown in FIG. 4 where the light bulb is extinguished.

In use the fishing lure light is connected to a fishing line 24 by passing the line through one or more of the holes 22 and knotting in an appropriate fashion. A hook 40 at the end of the line is then baited as desired. The lure light is activated by simply pressing the cover 18 down upon the housing to the light bulb energizing position shown in FIG. 3. The lighted fishing rig is then employed in the usual manner for night-time fishing or day-time fishing in murky or poorly illuminated waters.

The light from the bulb 16, while not of great intensity, serves as an attractant to lure fish that otherwise might not be attracted by the bait or other lure which might not be visible at the hook 40 at the end of the line.

After the use the light bulb is deenergized or switched off by the user. This is effected in a reverse manner to that previously described by simply holding the housing in one hand and pulling the cover up with the other hand until the contact and 34 moves out of contact with the contact button 27 of the battery. This is effected by simply moving the cover upwardly until the light goes out.

Various changes and modifications may be made within this invention as will be apparent to those skilled in the art. Such changes and modifications are within the scope and teaching of this invention as defined in the claims appended hereto.

I claim:

1. A fishing lure light comprising a plastic housing supporting a battery therein, said housing further supporting a water-tight cover manually moveable between a first compressed position to a second expanded position, said battery being electrically connected by electrical conductive lead means to a light bulb supported within the housing and switch means operable by the movement of the cover between said first and second positions, said housing being provided with eyelet means receiving a fishing line for attachment thereto, said housing having a cup-shaped cylindrical configuration and said cover fitting closely over an open top of said housing, said housing and cover being axially moveable toward and away from one another in a close friction fit sufficient to withstand water pressure when the lure light is immersed in water while retaining a water-tight relation to effect the operation of said switch means.

2. The fishing lure light of claim 1 in which a disc-shaped battery is press fitted within a circular inner wall of said housing.

3. The fishing lure light of claim 1 in which the cover has a top wall which acts as a stop member for the side wall of the housing when the cover and housing are moved toward each other.

4. The fishing lure light of claim 1 in which the housing has a base supporting said battery, said base being defined by an inverted cup-shaped member having a top wall serving as a rest support for said battery and a side wall of the housing surrounding said base closely engaging said battery and a flange portion defined by a lower portion of the housing side wall and a mating side wall of the base extending below said top wall of the base provided with at least one hole defining said eyelet means.

* * * * *